United States Patent
Skarp et al.

(10) Patent No.: US 10,499,285 B2
(45) Date of Patent: Dec. 3, 2019

(54) MAXIMUM CELL THROUGHPUT ESTIMATION

(71) Applicant: CLOUDSTREET OY, Helsinki (FI)

(72) Inventors: Mika Skarp, Espoo (FI); Sami Nippula, Veikkola (FI)

(73) Assignee: CLOUDSTREET OY, Helsinki (FI)

( * ) Notice: Subject to any disclaimer, the term of this patent is extended or adjusted under 35 U.S.C. 154(b) by 196 days.

(21) Appl. No.: 15/210,512

(22) Filed: Jul. 14, 2016

(65) Prior Publication Data

US 2018/0020379 A1  Jan. 18, 2018

(51) Int. Cl.

| | |
|---|---|
| H04L 12/26 | (2006.01) |
| H04W 28/20 | (2009.01) |
| H04B 17/318 | (2015.01) |
| H04B 17/336 | (2015.01) |
| H04W 24/08 | (2009.01) |
| H04W 28/24 | (2009.01) |
| H04L 12/24 | (2006.01) |
| H04W 28/18 | (2009.01) |
| H04W 24/02 | (2009.01) |
| H04L 1/00 | (2006.01) |

(52) U.S. Cl.
CPC ......... H04W 28/20 (2013.01); H04B 17/318 (2015.01); H04B 17/336 (2015.01); H04L 41/0896 (2013.01); H04L 41/5025 (2013.01); H04L 43/0876 (2013.01); H04W 24/02 (2013.01); H04W 24/08 (2013.01); H04W 28/18 (2013.01); H04W 28/24 (2013.01); H04L 1/0026 (2013.01)

(58) Field of Classification Search
CPC ..... H04W 24/08; H04W 24/10; H04W 88/08; H04W 88/02; H04W 24/02
See application file for complete search history.

(56) References Cited

U.S. PATENT DOCUMENTS

| | | | |
|---|---|---|---|
| 6,728,233 B1 * | 4/2004 | Park | H04W 28/18 370/335 |
| 2002/0183066 A1 * | 12/2002 | Pankaj | H04W 72/1226 455/453 |

(Continued)

OTHER PUBLICATIONS

International Search Report International Application No. PCT/FI2017/050529 dated Sep. 22, 2017.

*Primary Examiner* — Atique Ahmed
(74) *Attorney, Agent, or Firm* — Squire Patton Boggs (US) LLP

(57) ABSTRACT

Various communication systems may benefit from appropriate estimation of communication parameters. For example, wireless communication systems, such as those associated with the Third Generation Partnership Project (3GPP), Long Term Evolution (LTE), LTE-Advanced (LTE-A), and the like, may benefit from a maximum cell throughput estimation. A method can include obtaining measurements of a plurality of signal parameters from a plurality of users in an area. The method can also include determining maximum bitrates for each of the users from the signal parameters. The method can further include comparing the maximum bitrates to theoretical bitrates to obtain a ratio. The method can additionally include providing a momentary maximum throughput by scaling a theoretical maximum throughput using the ratio.

20 Claims, 4 Drawing Sheets

(56) References Cited

U.S. PATENT DOCUMENTS

| | | | |
|---|---|---|---|
| 2006/0182065 A1* | 8/2006 | Petrovic | H04L 47/12 370/332 |
| 2006/0218264 A1* | 9/2006 | Ogawa | H04L 47/10 709/223 |
| 2007/0081462 A1* | 4/2007 | Gefflaut | H04W 28/08 370/235 |
| 2010/0034106 A1* | 2/2010 | Hu | H04L 43/0882 370/252 |
| 2011/0013538 A1 | 1/2011 | Henocq et al. | |
| 2012/0263120 A1* | 10/2012 | Gopalakrishnan | H04W 72/1226 370/329 |
| 2013/0143583 A1* | 6/2013 | Son | H04W 72/0406 455/452.2 |
| 2014/0256335 A1* | 9/2014 | Kobayashi | H04W 16/22 455/450 |
| 2014/0349647 A1* | 11/2014 | Chen | H04W 36/30 455/436 |
| 2016/0007226 A1* | 1/2016 | Kim | H04W 28/0236 370/252 |
| 2016/0156430 A1 | 6/2016 | Madan et al. | |

\* cited by examiner

| CQI Index | Modulation | Coding rate * 1024 | Bits per resource |
|---|---|---|---|
| 0 | out of range | N/A | N/A |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 1

Figure 4

MAXIMUM CELL THROUGHPUT ESTIMATION

BACKGROUND

Field

Various communication systems may benefit from appropriate estimation of communication parameters. For example, wireless communication systems, such as those associated with the Third Generation Partnership Project (3GPP), Long Term Evolution (LTE), LTE-Advanced (LTE-A), and the like, may benefit from a maximum cell throughput estimation.

Description of the Related Art

Conventional mobile networks have a cellular structure. Nominal, or theoretical, cell throughput capacity of cells of such networks may be based on underlying radio technology, frequency bandwidth and modulation in use. Within each radio technology, there are typically many modulation schemes that can be used in one cell to provide larger/smaller coverage or higher/lower bit rates. Maximal cell throughput capacity can depend on factors such as where actual users are located in the cell, the distance of those users from the access node e.g. evolved Node B (eNodeB), radio frequency (RF) interference level(s), radio propagation environment, and modem/eNodeB modulation capabilities. Thus, theoretical cell capacity cannot be met in practice and real life capacity may vary significantly. Measurements of cell throughput can identify how much traffic is going through, but cannot identify the maximum throughput in given conditions.

In a cell environment, the number of maximum users and maximum number of bearers may be limited and fixed. In traditional network technologies cell resources have been allocated equally between users. There is a Quality of Service (QoS) feature set defined in 3GPP specifications, which have been implemented by some mobile network vendors. Using a QoS feature set, service levels can be differentiated based on applications in use by individual users. Different applications may require different service levels from the network to work as planned.

The RF conditions of a cell can be represented on the basis of measured signal qualities such as the following: Reference Signal Received Power (RSRP), Reference Signal Received Quality (RSRQ), and Signal to Interference plus Noise Ratio (SINR). For example, RF conditions may be excellent when RSRP is greater than or equal to −80 dBm, good when RSRP is from −80 dBm to −90 dBm, medium or "mid cell" when RSRP is from −90 dBm to −100 dBm, and weak or "cell edge" when RSRP is less than or equal to −100 dBm. Similarly, RF conditions may be excellent when RSRQ is greater than or equal to −10 dB, good when RSRQ is from −10 dB to −15 dB, medium or "mid cell" when RSRQ is from −15 dB to −20 dB, and weak or "cell edge" when RSRQ is less than −20 dB. Likewise, RF conditions may be excellent when SINR is greater than or equal to 20 dB, good when SINR is from 13 dB to 20 dB, medium or "mid cell" when SINR is from 0 dB to 13 dB, and weak or "cell edge" when SINR is less than or equal to 0 dB.

These parameters can be measured for each individual user both in the uplink direction and in the downlink direction. These parameters can be used for, for example, handover purposes, such as to evaluate when it would be beneficial to hand a given call over to a neighboring cell.

Maximum throughput for an LTE connection can be calculated based on channel parameters. Such channel parameters include the number of resource elements allocated to the physical downlink shared channel (PDSCH), the modulation scheme applied to each resource element, the quantity of redundancy included by physical layer processing, and the use of multiple antenna transmission schemes.

SUMMARY

According to certain embodiments, a method can include obtaining measurements of a plurality of signal parameters from a plurality of users in an area. The method can also include determining maximum bitrates for each of the users from the signal parameters. The method can further include comparing the maximum bitrates to theoretical bitrates to obtain a ratio. The method can additionally include providing a momentary maximum throughput by scaling a theoretical maximum throughput using the ratio.

In certain embodiments, an apparatus can include at least one processor and at least one memory including computer program code. The at least one memory and the computer program code are configured to, with the at least one processor, cause the apparatus at least to obtain measurements of a plurality of signal parameters from a plurality of users in an area. The at least one memory and the computer program code are also configured to, with the at least one processor, cause the apparatus at least to determine maximum bitrates for each of the users from the signal parameters. The at least one memory and the computer program code are further configured to, with the at least one processor, cause the apparatus at least to compare the maximum bitrates to theoretical bitrates to obtain a ratio. The at least one memory and the computer program code are additionally configured to, with the at least one processor, cause the apparatus at least to provide a momentary maximum throughput by scaling a theoretical maximum throughput using the ratio.

An apparatus, according to certain embodiments, can include means for obtaining measurements of a plurality of signal parameters from a plurality of users in an area. The apparatus can also include means for determining maximum bitrates for each of the users from the signal parameters. The apparatus can further include means for comparing the maximum bitrates to theoretical bitrates to obtain a ratio. The apparatus can additionally include means for providing a momentary maximum throughput by scaling a theoretical maximum throughput using the ratio.

A computer program product can, in certain embodiments, encode instructions for performing a process. The process can include obtaining measurements of a plurality of signal parameters from a plurality of users in an area. The process can also include determining maximum bitrates for each of the users from the signal parameters. The process can further include comparing the maximum bitrates to theoretical bitrates to obtain a ratio. The process can additionally include providing a momentary maximum throughput by scaling a theoretical maximum throughput using the ratio.

A non-transitory computer-readable medium can, according to certain embodiments, be encoded with instructions that, when executed in hardware, cause a device to perform a process. The process can include obtaining measurements of a plurality of signal parameters from a plurality of users in an area. The process can also include determining maximum bitrates for each of the users from the signal parameters. The process can further include comparing the maximum bitrates to theoretical bitrates to obtain a ratio. The process can additionally include providing a momentary maximum throughput by scaling a theoretical maximum throughput using the ratio.

BRIEF DESCRIPTION OF THE DRAWINGS

For proper understanding of the invention, reference should be made to the accompanying drawings, wherein:

FIG. 4 illustrates table 1, a table of mapping between RF value and maximum throughput, according to certain embodiments.

DETAILED DESCRIPTION

Certain embodiments address the issue of how to calculate maximum throughput of cell at any given time and for any given condition. More particularly, certain embodiments can address how to calculate a throughput estimation of an actual user in a real cell, not just a theoretical maximum. Moreover, certain embodiments can use the throughput estimation to estimate a realistic estimation for a maximum throughput for the whole cell in a given radio environment.

Figure 1:
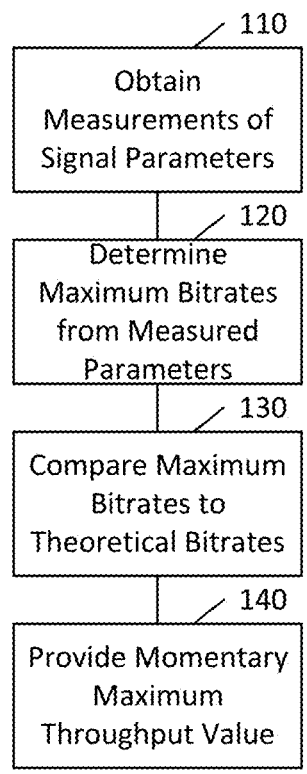
FIG. 1 illustrates a method according to certain embodiments.

FIG. 1 illustrates a method according to certain embodiments. The method can be performed by an access node, such as a base station, evolved Node B, or access point.

As shown in FIG. 1, a method can include, at 110, obtaining measurements of a plurality of signal parameters from a plurality of users in an area. The plurality of signal parameters can include reference signal received power, reference signal received quality, and signal to interference plus noise ratio. Other signal parameters can also or alternatively be taken into account. The plurality of users can include at least one active user and at least one idle user. For example, the plurality of users can include all the users in the area that are served by the access node, whether they are active or idle.

For example, for the uplink an access node, such as an eNodeB, can measure (uplink) RF values from every user. Likewise, for the downlink the access node can receive RF measurement results from each user equipment (UE). As mentioned above, these RF measurement results can include, for example, RSRP, RSRQ, and/or SINR values from every user, including both active UEs and those UEs that are idle. Other possibilities for values to be determined or measured can be for example cell bandwidth, interference, UE movement or UE capabilities. In some embodiments at least some the values can be combined to a single parameter, e.g. Cell Quality Index (CQI). For downlink measurement combining several parameters to a single value may reduce the need of communication between the UE and the access node. The downlink report from the UE can be directed to the access node, or sent to the other network entities like the Dynamic Profile Controller, explained in more detail later. The uplink and downlink calculations can be kept separate and independent from one another.

The method can also include, at 120, determining maximum bitrates for each of the users from the signal parameters. The determination of the maximum bitrates can take into account how many users are in the area. The area may be, for example, a cell or sub-cell.

The measured RF and other values or parameters can be translated to known maximum bit rates using e.g tables like shown in table 1, in FIG. 4. In table 1 the CQI index is mapped to a modulation, coding rate and bits per resource. The system can use the combination of the modulation and coding scheme and used radio resource blocks to calculate possible maximum transmission bitrate for the individual UE. Typically, the number of radio blocks can be assumed to be distributed evenly between reported users. If technologies are used to do smart scheduling that algorithm can be used to do resource distribution. If the number of reported users in a cell is below a maximum number of active user in cells, missing users can be assigned an assumed CQI value based on historical data of the cell or based on normal distribution.

The information used to transfer the reported or measured values to maximum bit rates can be based on, for example, field measurements and simulations or be previously known by some other way. The formula or matrix of ratios can be the same for every user, but may also depend on modem capability in the UE and eNodeB.

The method can further include, at 130, comparing the above calculated maximum bitrates to theoretical bitrates to obtain a ratio. As explained earlier, maximum theoretical throughput for an LTE connection can be calculated based on channel parameters. Such channel parameters include the number of resource elements allocated to the physical downlink shared channel (PDSCH), the modulation scheme applied to each resource element, the quantity of redundancy included by physical layer processing, and the use of multiple antenna transmission schemes.

This calculation can be repeated for each user. If fewer than a maximum number of users are reported, there can also be an estimation of maximum bit rates of missing users, as explained above. Thus a maximum bitrate estimation for the current cell in current conditions can be calculated. This value can be compared to the theoretical maximum bitrate for the given number of users and bearers in the cell. This can be referred to as an individual ratio.

Furthermore, a cell level parameter can be calculated, e.g. by combining all the individual ratios to a single cell level ratio. The cell level parameter can also be a sum of all individual throughputs, an average per user. Thus the above explained calculation of individual ration can be done using e.g. the combined bit rate for all the users or average bit rates per user.

The method can additionally include, at 140, providing a momentary maximum throughput by scaling a theoretical maximum throughput using the ratio. A momentary maximum throughput for the cell can be estimated. For example, a cell level ratio can be multiplied by a theoretical maximum throughput or the sum of calculated individual maximum bitrates can be used as an estimation for momentary maximum throughput.

Thus, for example, an eNodeB can measure RSRP, RSRQ, SINR values from every user, whether active or idle. RF values can be translated to known maximum bitrates. This translated value can be compared to a theoretical value for that number of users in that cell, using cell bandwidth information and network planning information. The individual maximum bitrates or individual ratios are used to calculate a cell level parameter. This cell level parameter can be used to calculate momentary maximum throughput number e.g. by multiplying the cell level ratio with a theoretical maximum throughput.

Such embodiments can be variously used and applied. One embodiment is a network where a Dynamic Profile Controller (DPC) or similar entity is used to control at least part of the transmission capacity of a network. Examples of such network include public cellular networks where the Public Safety Entities (PSE), like police, firefighters or emergency medical services are using to DPC to reserve necessary throughput for their communication is emergency situations. Other example include cases in which the operator has allocated part of the operator's transmission capacity for another entity, which is using a DPC to sell that capacity independently to its customers, e.g. media companies reporting a sport event.

In some embodiments a DPC can use the maximum throughput information to make sure a cell is not driven to congestion. For example, the DPC may limit the number of service level agreement (SLA) guaranteed users/bearers. In the case of carrier aggregation, several pieces of RF level information can be combined to make the decision in the DPC, as to whether a requested service level can be delivered.

When the dynamic profile controller is using the maximum throughput to make sure cell is not driven to congestion, it may be very practical for the DPC to know how much capacity cell can actually deliver. Moreover, as mentioned above, the same approach can also work in a carrier aggregation situation.

In some embodiments the DPC is the entity making the throughput calculations explained above. The DPC may receive the RF measurement values, as well other needed values from the other entities. For example, the access node can provide its own measurements as well as the values the access node has received from the UE to the DPC. Alternatively, the UE can send the downlink reports to DPC, using for example a dedicated bearer between the UE and DPC. Parameters could be received either by other entities or directly by an operator via an operation and maintenance interface.

Figure 2:
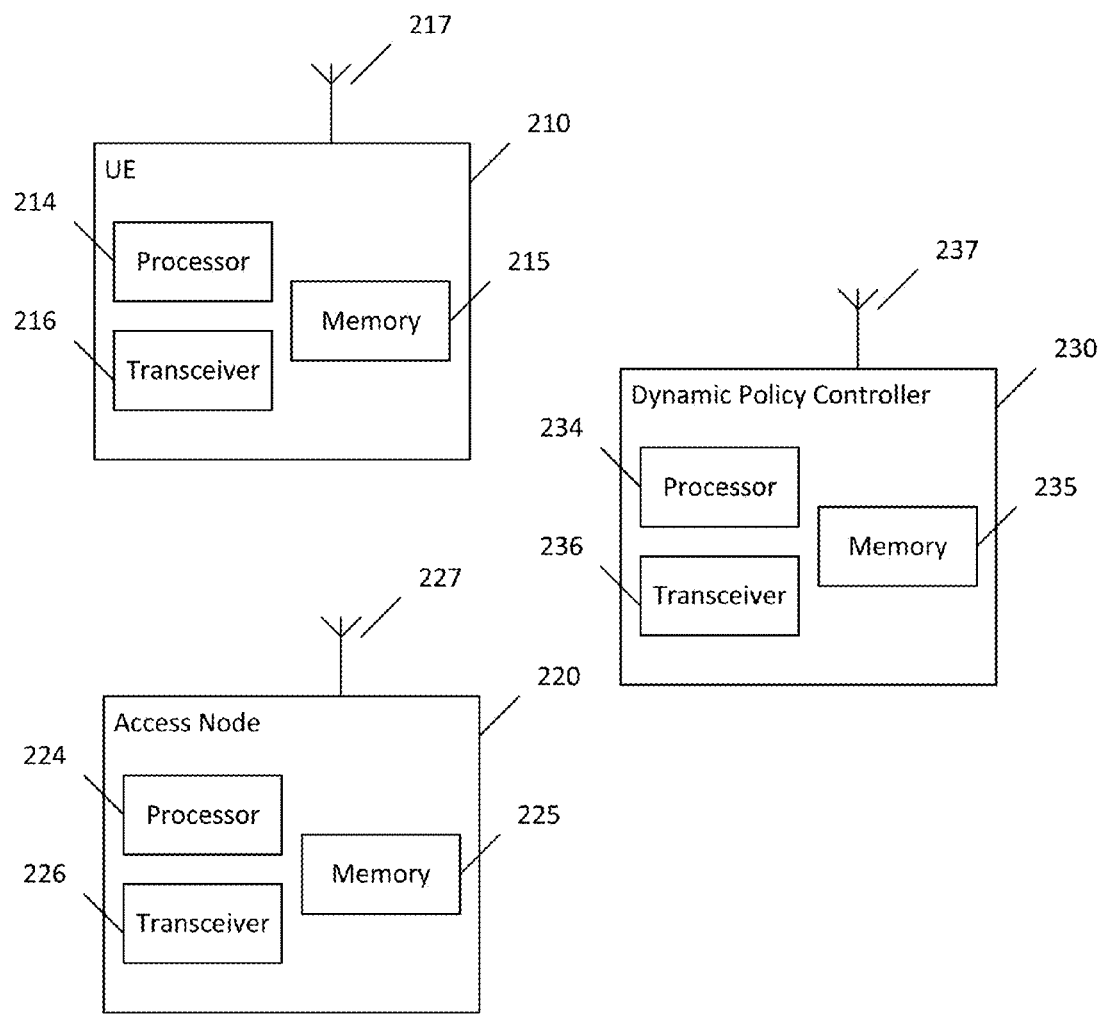
FIG. 2 illustrates a system according to certain embodiments.

FIG. 2 illustrates a system according to certain embodiments of the invention. In one embodiment, a system may include multiple devices, such as, for example, at least one UE 210, at least one access node 220, which may be an eNodeB, or other base station or access point, and at least one dynamic profile controller 230, which may be a server configured to help a network avoid congestion.

Each of these devices may include at least one processor, respectively indicated as 214, 224, and 234. At least one memory can be provided in each device, and indicated as 215, 225, and 235, respectively. The memory may include computer program instructions or computer code contained therein. The processors 214, 224, and 234 and memories 215, 225, and 235, or a subset thereof, can be configured to provide means corresponding to the various blocks of FIG. 1.

As shown in FIG. 2, transceivers 216, 226, and 236 can be provided, and each device may also include an antenna, respectively illustrated as 217, 227, and 237. Other configurations of these devices, for example, may be provided. For example, dynamic profile controller 230 may be configured for wired communication, instead of or in addition to wireless communication, and in such a case antenna 237 can illustrate any form of communication hardware, without requiring a conventional antenna.

Transceivers 216, 226, and 236 can each, independently, be a transmitter, a receiver, or both a transmitter and a receiver, or a unit or device that is configured both for transmission and reception.

Processors 214, 224, and 234 can be embodied by any computational or data processing device, such as a central processing unit (CPU), application specific integrated circuit (ASIC), or comparable device. The processors can be implemented as a single controller, or a plurality of controllers or processors.

Memories 215, 225, and 235 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 210, access node 220, and dynamic profile controller 230, to perform any of the processes described herein (see, for example, FIG. 1). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 2 illustrates a system including a UE, access node, and dynamic profile controller, embodiments of the invention may be applicable to other configurations, and configurations involving additional elements. For example, not shown, additional UEs may be present, and additional core network elements may be present.

A dynamic profile controller (DPC) can be a device configured to manage wireless transmission capacity. For example, the DPC can be configured to manage network profiles so as to provide predetermined service levels for different applications.

Figure 3:
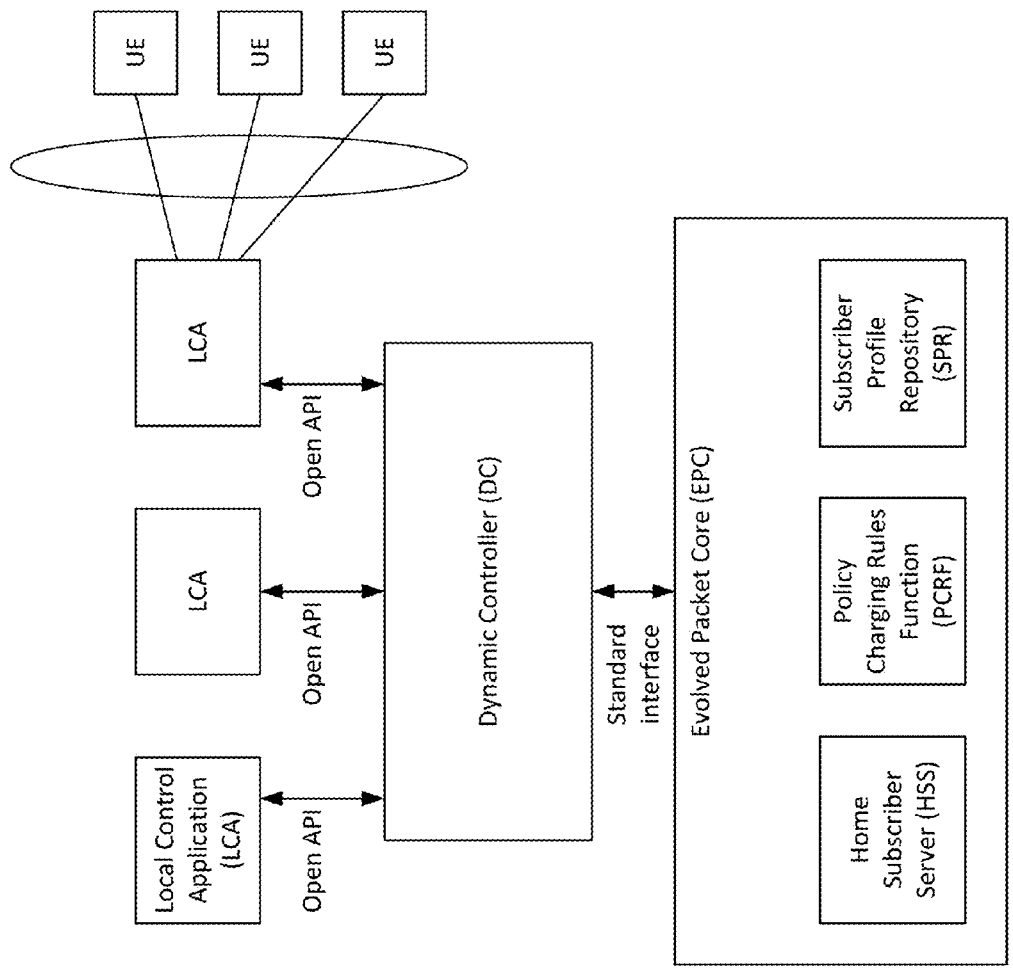
FIG. 3 illustrates a dynamic controller/local controller architecture, according to certain embodiments.

FIG. 3 illustrates a dynamic controller/local controller architecture, according to certain embodiments. As shown in FIG. 3, a dynamic controller (DC) which may be a DPC, can be connected via an open application programming interface (API) to various local control applications (LCAs), which in turn can govern various user equipment (UEs). The DC can be connected via a standard interface to an evolved packet core (EPC) including functional elements such as a home subscriber server (HSS), policy and charging rules function (PCRF), and subscription/subscriber profile repository (SPR).

Certain embodiments may have various benefits and/or advantages. For example, a realistic maximum throughput estimation can be calculated, taking into account realistic radio conditions in the cell. This improved estimate may make radio resource management more accurate or better, as the system may have better estimation as to when the system would be running out of resources. Thus, for example, congestion avoidance may be improved. The system according to certain embodiments may not require any real-time traffic measurements or probes. Thus, certain embodiments may be efficiently implemented in large networks, while providing accurate capacity estimations even when there is no or little traffic in the network.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    obtaining measurements of a plurality of signal parameters from a plurality of users in a cell or a sub-cell;
    determining maximum bitrates for each of the users from the signal parameters;
    calculating at least one theoretical maximum bitrate using at least one channel parameter;
    comparing the maximum bitrates to the at least one theoretical maximum bitrate to obtain a ratio; and
    providing a momentary maximum throughput by scaling a theoretical maximum throughput using the ratio,
    wherein the theoretical maximum bitrates are obtained based on number of users in the cell or the sub-cell, cell bandwidth information, and network planning information.

2. The method of claim 1, wherein the plurality of signal parameters comprise reference signal received power, reference signal received quality, and signal to interference plus noise ratio.

3. The method of claim 1, wherein the method is performed by a base station, evolved Node B, or access point.

4. The method of claim 1, wherein the plurality of users comprise at least one active user and at least one idle user.

5. The method of claim 1, wherein the determining the maximum bitrates comprises taking into account how many users are in the cell or the sub-cell.

6. The method of claim 1, wherein the obtaining measurements comprises at least one of measuring parameters in an uplink or receiving downlink measurements from a user equipment.

7. The method of claim 1, wherein the comparing the maximum bitrates to the theoretical maximum bitrates to obtain a ratio comprises obtaining, for each user, an individual ratio by comparing a value for each user to a theoretical maximum value for a given number of users in the cell or the sub-cell.

8. The method of claim 7, wherein the comparing the maximum bitrates to the theoretical maximum bitrates to obtain a ratio comprises combining all individual ratios to form a cell level parameter.

9. The method of claim 8, wherein the cell level parameter comprises a sum of all individual throughputs or an average throughput per user.

10. The method of claim 1, wherein the calculated maximum throughput is an uplink maximum throughput or a downlink maximum throughput.

11. An apparatus, comprising:
    at least one processor; and
    at least one memory including computer program code,
    wherein the at least one memory and the computer program code are configured to, with the at least one processor, cause the apparatus at least to
    obtain measurements of a plurality of signal parameters from a plurality of users in a cell or a subcell;
    determine maximum bitrates for each of the users from the signal parameters;
    calculate at least one theoretical maximum bitrate using at least one channel parameter;
    compare the maximum bitrates to the at least one theoretical maximum bitrate to obtain a ratio; and
    provide a momentary maximum throughput by scaling a theoretical maximum throughput using the ratio,
    wherein the theoretical maximum bitrates are obtained based on number of users in the cell or the sub-cell, cell bandwidth information, and network planning information.

12. The apparatus of claim 11, wherein the plurality of signal parameters comprise reference signal received power, reference signal received quality, and signal to interference plus noise ratio.

13. The apparatus of claim 11, wherein the apparatus comprises a base station, evolved Node B, or access point.

14. The apparatus of claim 11, wherein the plurality of users comprise at least one active user and at least one idle user.

15. The apparatus of claim 11, wherein the determination of the maximum bitrates comprises taking into account how many users are in the cell or the sub-cell.

16. The apparatus of claim 11, wherein obtaining the measurements comprises at least one of measuring parameters in an uplink or receiving downlink measurements from a user equipment.

17. The apparatus of claim 11, wherein the comparison of the maximum bitrates to the theoretical maximum bitrates to obtain the ratio comprises obtaining, for each user, an individual ratio by comparing a value for each user to a theoretical maximum value for a given number of users in the cell or the sub-cell.

18. The apparatus of claim 17, wherein the comparison of the maximum bitrates to the theoretical maximum bitrates to obtain the ratio comprises combining all individual ratios to form a cell level parameter.

19. The apparatus of claim 18, wherein the cell level parameter comprises a sum of all individual throughputs or an average throughput per user.

20. The apparatus of claim 11, wherein the calculated maximum throughput is an uplink maximum throughput or a downlink maximum throughput.

* * * * *